Oct. 2, 1934.  H. D. GEYER  1,975,145

VIBRATION ABSORBING CONNECTER

Filed Sept. 15, 1932

Inventor

Harvey D. Geyer.

By Spencer Hardman & Fehr his attorneys

Patented Oct. 2, 1934

1,975,145

UNITED STATES PATENT OFFICE 1,975,145

VIBRATION-ABSORBING CONNECTER

Harvey D. Geyer, Dayton, Ohio, assignor, by mesne assignments, to General Motors Corporation, Detroit, Mich., a corporation of Delaware Application September 15, 1932, Serial No. 633,300

8 Claims. (Cl. 248—14.2)

This invention relates to yielding connecters, especially such as are adapted for mounting automobile engines, transmission units, or any mechanical device subject to vibrations, upon a supporting base. The general object of this invention is to provide a simple and efficient universally yieldable metal-isolating connecter which is more freely yieldable in one direction than another.

A special object is to provide a universally yieldable connecter having a fluid (either air, or liquid, or an easily flowing solid such as very soft rubber) entrapped in a closed chamber therein so that the connected parts are held in a substantially floating relationship when the force is applied to the connecter in one direction but wherein the parts are sustained against excessive movement in another direction.

A more specific object is to provide a universally yieldable connecter that will more readily permit movement between the connected parts in its main axial direction than in a direction transverse said main axis.

Further objects and advantages of the present invention will be apparent from the following description, reference being had to the accompanying drawing wherein a preferred embodiment of one form of the present invention is clearly shown.

In the drawing.

In the drawing similar reference characters refer to similar parts throughout the several views.

Figure 1:
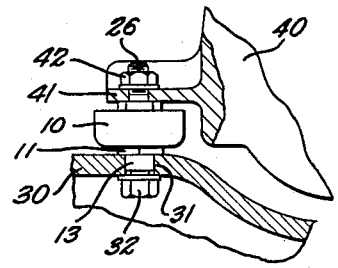
Fig. 1 is a diagrammatic view showing a yieldable connecter made according to this invention used to support one side of an automobile transmission unit upon a chassis frame cross member. A similar connecter located in the opposite side of the transmission unit is not shown.
Figure 2:
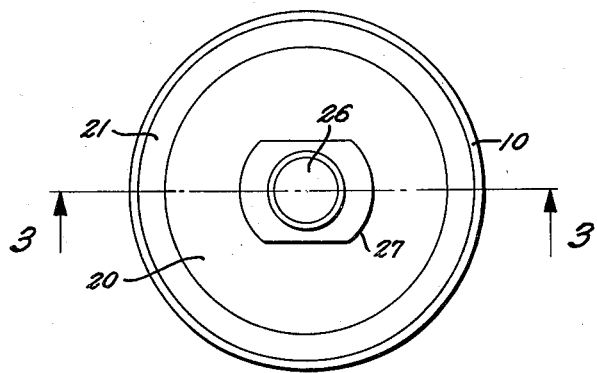
Fig. 2 is a plan view of the connecter shown in Fig. 3.
Figure 3:
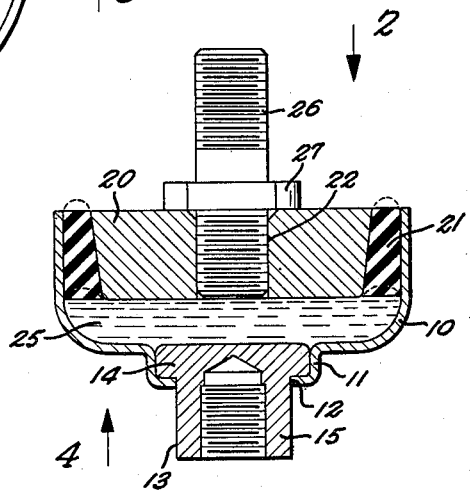
Fig. 3 is a center line section of the connecter chosen for illustration.
Figure 4:
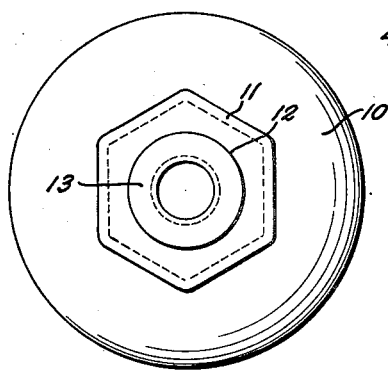
Fig. 4 is a bottom view of Fig. 3.

Numeral 10 designates an outer metal cup or casing, preferably of pressed metal, having a hexagon-shaped depression 11 formed in the bottom thereof and a hole 12 at the center. A special nut 13 having a hexagon flange 14 fits snugly within the depression 11 and the round body 15 of the nut projects through the hole 12. Nut 13 is preferably brazed or welded to the cup 10 so there can be no leakage of fluid around the joint. A metal head 20, preferably of slightly conical form and having its periphery spaced inwardly from the walls of cup 10 a certain desired amount, is secured in place by the annular soft rubber body 21 so that there will be a strong non-slipping grip between the rubber 21 and both the cup 10 and head 20. Preferably this grip is obtained by vulcanizing the rubber 21 in situ between the cup 10 and head 20, care being taken to secure a strong vulcanizing bond between the rubber and metal. A closed chamber 25 is thus provided in the lower portion of cup 10. The head 20 has a central threaded hole 22 therein and through this hole the chamber 25 may be filled with the desired fluid, which fluid may be air, liquid, or a fluent solid as mentioned above. If a liquid is used, which is preferable, it should be preferably a viscous liquid that will not attack the rubber 21, for instance castor oil or other suitable vegetable oil. If a fluent solid is used it may be a very soft rubber or any highly plastic solid or semi-solid, such as a bituminous compound, which varies but little in plasticity with varying temperatures.

A threaded stud 26 is screwed into the hole 22 after chamber 25 is filled with fluid as described above. A non-round integral flange 27 on stud 26 enables stud 26 to be screwed tightly in place with a wrench. The connecter unit is then ready to be mounted upon the parts to be connected thereby.

In Fig. 1, the lower projecting nut 13 seats snugly within the hole 31 in the supporting frame member 30 and a suitable lock-washer and bolt 32 rigidly fixes the cup 10 of the connecter to the frame member 30. The transmission unit 40 has a flange 41 thereon having a bolt hole through which the projecting stud 26 of the connecter extends. A suitable lock washer and nut 42 rigidly fixes the transmission unit 40 to the metal head 20 of the connecter.

In operation, the weight or down loads of the unit 40 upon the connecter are sustained by the compression of the fluid in the closed chamber 25 and by the resistance to shearing forces of the rubber annulus 21. That is to say, when the head 20 is forced downwardly the fluid in chamber 25 is put under compression. If air is used as the fluid, its volume is reduced by such compression and the rubber annulus 21 is capable of considerable shearing strain and the connecter yields in that manner. If a non-compressible liquid or fluent plastic is used as the fluid, the compression thereupon will cause such fluid to bulge the soft rubber annulus 21 upward between the head 20 and cup 10 to the extent demanded by the down movement of head 20 and the connecter yields in that manner. In either case, the head 20 acts as if it were floating upon the fluid in chamber 25, that is, it is simultaneously permitted quite free rocking movements in any direction due to the easy yielding of the rubber annulus 21 under such rocking.

Resultant vertical up forces exerted by the transmision unit 40 put the connecter under tension and such forces are opposed by the yielding resistance of the rubber annulus 21 to shear and, in case a liquid is used as the fluid, partly by the creation of a vacuum above the surface of the liquid. Obviously the connecter will yield more readily when in tension than when in compression. In either case quite free rocking movement is permitted as just described, thereby giving a freely floating action.

Transverse or horizontal movements of the unit 40 relative to the support frame 30 are yieldingly opposed by a direct compression of the rubber annulus 21, as will be obvious from the drawing, and hence such horizontal movements though permitted in any direction are restricted to quite small limits due to the relatively small depth of rubber in the direction of such compression.

While this invention is primarily intended for use in fastening an automobile engine unit to the chassis frame and eliminating metallic contact between the two, it may be used in mounting machines or parts of machines or other devices of various kinds to their bases or other supports in such a way as to reduce or prevent the transmission of vibration or shock through the connecter element.

While the form of embodiment of the present invention as herein disclosed, constitutes a preferred form, it is to be understood that other forms might be adopted, all coming within the scope of the claims which follow.

What is claimed is as follows:

1. A yielding connecter adapted for mounting engines and the like upon a support, comprising: a metal cup having means for fixing to one of the connected members, a head having means for fixing to the other connected member and yieldingly supported in isolated relation within said cup by a yielding rubber body bonded by vulcanization to both said cup and head, said head and rubber body together being spaced from the cup bottom to form a closed chamber therein, and a liquid permanently entrapped in said chamber.

2. A connecter for yieldably connecting two members, comprising: a metal cup having means for fixing to one of said members, a head having means for fixing to the other of said members and isolatedly supported within said cup by an intervening yielding rubber body bonded by vulcanization to both said cup and head, said head and rubber body together forming a closure for the upper portion of said cup and having a closed chamber therein, and a fluid permanently entrapped in said chamber.

3. A connecter for yieldably connecting two members, comprising: a metal cup having means for fixing to one of said members, a head having means for fixing to the other of said members and located within the upper portion of said cup and yieldingly secured thereto by a surrounding body of yielding rubber bonded by vulcanization to both said cup and head, said head and rubber body together forming a closure for said cup and thereby forming a closed chamber therein, and a fluid permanently entrapped in said chamber.

4. A connecter for yieldably connecting two members, comprising: a metal cup having means for fixing to one of said members, a head adapted to be fixed to the other of said members and universally yieldingly supported within the upper portion of said cup by an annular rubber body bonded by vulcanization to both said head and cup, said head and rubber body forming a closure for the upper portion of said cup and thereby forming a closed chamber in said cup, and a fluid in said chamber.

5. A connecter for yieldably connecting two members, comprising: a metal cup having means for fixing to one of said members, a head adapted to be fixed to the other member and universally yieldingly supported within said cup by a surrounding body of soft rubber, said head and rubber body together forming a closed chamber in said cup below said head, and a liquid permanently entrapped in and normally filling said chamber and aiding in sustaining axial compression loads upon said connecter.

6. A universally yielding connecter for connecting two members, comprising: an outer metal casing adapted to be fixed to one of said members, an inner head adapted to be fixed to the other member and supported within said casing by a surrounding body of yielding rubber and thereby forming a closure for the upper portion of said casing, and a closed chamber in said casing below said head containing a permanently entrapped fluid, said rubber being so arranged that it is in shear when axial loads are applied to the connector and in direct compression when transverse loads are applied thereto, whereby relative axial movement between the connected members is more free than relative movement therebetween transversely of said casing.

7. A universally yielding connecter for connecting two members, comprising: an outer metal casing adapted to be fixed to one of said members, an inner head adapted to be fixed to the other member and supported within said casing by a surrounding annular body of yielding non-metallic material bonded by vulcanization to said head and casing and thereby forming a closure for the upper portion of said casing, and a closed chamber in said casing below said head containing a permanently entrapped liquid, said entrapped liquid acting upon and bulging said yielding material outwardly when axial compression loads are applied to the connecter.

8. A universally yielding connecter for connecting two members, comprising: an outer metal casing adapted to be fixed to one of said members, an inner head adapted to be fixed to the other member and supported within said casing by a surrounding annular body of yielding non-metallic material of relatively small radial thickness and having its axial surfaces bonded by vulcanization to both said head and casing and thereby forming a closure for the upper portion of said casing, and a closed chamber in said casing below said head containing an entrapped liquid.

HARVEY D. GEYER.